United States Patent [19]

Bauer

[11] Patent Number: 5,292,247
[45] Date of Patent: Mar. 8, 1994

[54] APPARATUS FOR THERMAL PROCESSING OF RAW MATERIALS IN DUST FORM

[75] Inventor: Claus Bauer, Cologne, Fed. Rep. of Germany

[73] Assignee: Klöckner-Humboldt-Deutz Aktiengesellschaft, Cologne, Fed. Rep. of Germany

[21] Appl. No.: 912,847

[22] Filed: Jul. 13, 1992

[30] Foreign Application Priority Data

Jul. 13, 1991 [DE] Fed. Rep. of Germany ....... 4123306

[51] Int. Cl.$^5$ .............................................. F27B 7/02
[52] U.S. Cl. ...................................... 432/58; 432/106; 432/14
[58] Field of Search ............................. 432/15, 58, 106

[56] References Cited

U.S. PATENT DOCUMENTS

| | | | |
|---|---|---|---|
| 4,295,823 | 10/1981 | Ogawa et al. | 432/14 |
| 4,337,032 | 6/1982 | Duplouy et al. | 432/58 |
| 4,425,092 | 1/1984 | Brachthauser et al. | 432/106 |
| 4,457,705 | 7/1984 | Ramesohl et al. | 432/106 |
| 4,514,170 | 4/1985 | Kupper | 432/106 |

*Primary Examiner*—Henry C. Yuen
*Attorney, Agent, or Firm*—Charles L. Schwab

[57] ABSTRACT

In cement clinker production lines having calcinator connected upstream of the rotary kiln and equipped with a second firing, in order that the most complete possible burnup or residual burnup, favorable from the standpoint of thermal economy, of uncombusted fuel constituents such as, for example, CO and/or uncombusted residual carbon be enabled in the calcinator, and indeed in the case of calcinators without, but in particular with, a device for the reduction of the $NO_x$ component present in the furnace off-gas (rotary kiln off-gas and calcinator off-gas), a low-pressure-drop swirl chamber (33) is arranged in the calcination stage (17) in the region of its flow diversion, which swirl chamber has an opening (32) in its upper region for the tangential inlet of gas-solids suspension and a central opening (34) on its bottom for the discharge of the swirled gas-solids suspension, and in its interior a solids-free or solids-poor, temperature-controlled core zone (36) of elevated temperature can be maintained for the implementation of certain reactions.

12 Claims, 1 Drawing Sheet

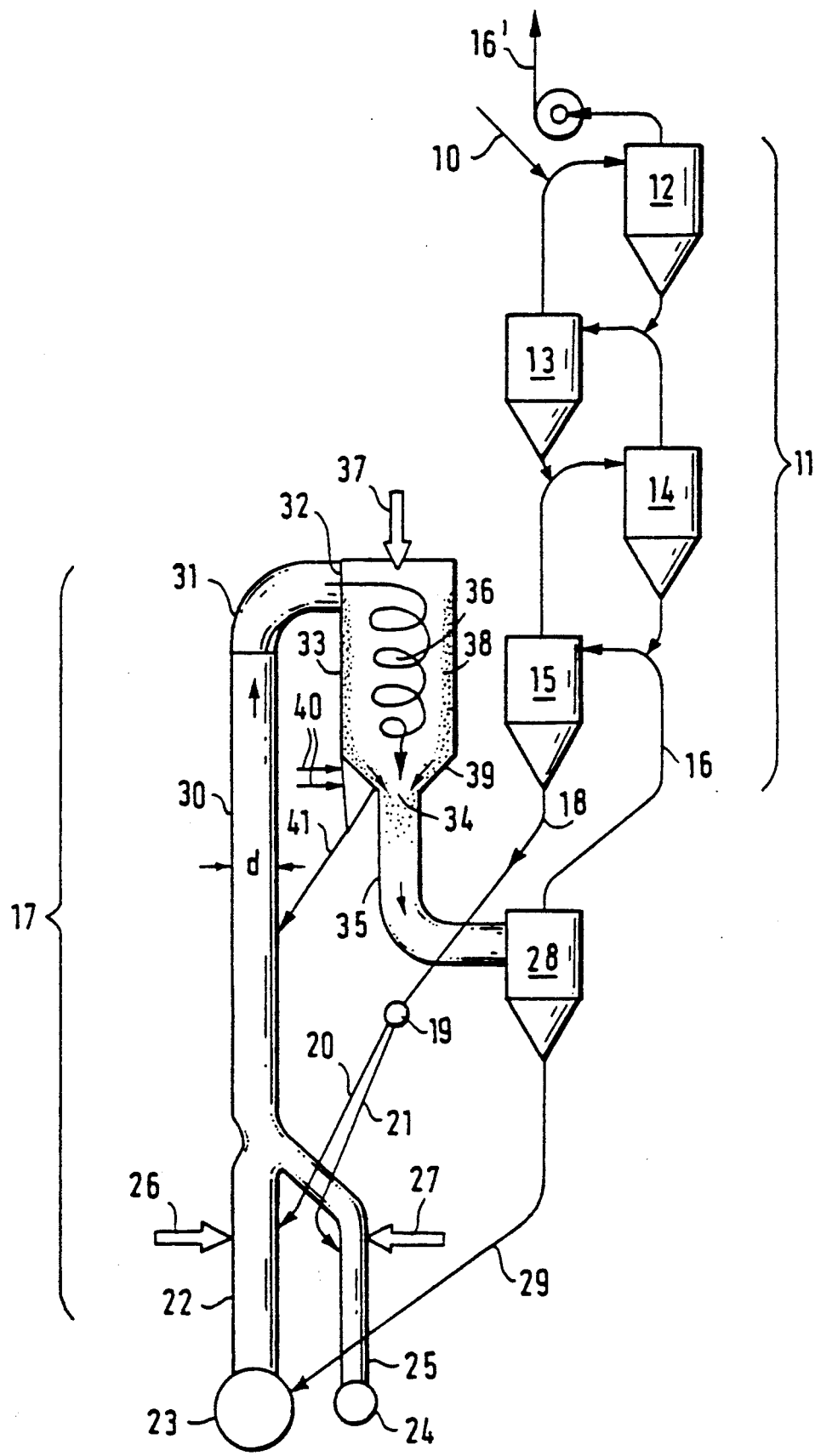

APPARATUS FOR THERMAL PROCESSING OF RAW MATERIALS IN DUST FORM

TECHNICAL FIELD

This invention relates to an apparatus for thermal processing of raw materials in dust form, in particular in the production of cement clinker from cement raw meal, said raw meal being thermally processed in a burning process by means of preheating, calcination, sintering and cooling, and the off-gas stream of the sintering stage and the exhaust air stream of the cooling stage from the clinker cooler being utilized separately or jointly for the calcination of the raw meal in the calcination stage, which is supplied with fuel, the gas-solids suspension in the calcination stage being diverted and led into the lowermost cyclone of the cyclone preheater for the purpose of separating the calcined raw meal from the gas stream, a swirl chamber being arranged in the calcination stage in the region of its flow diversion for the purpose of imparting a swirl to the gas-solids suspension.

INFORMATION DISCLOSURE STATEMENT

In devices for the production of cement clinker from cement raw meal, in order to avoid uneconomically long and/or large-diameter rotary kilns and to hold down the specific heat requirement of the cement clinker production process, it is known to connect a calcinator upstream of the rotary kiln, viewed in the direction of material flow, which calcinator is equipped with a secondary firing (in addition to the firing in the rotary kiln). In the secondary firing, the supplied fuel of whatever kind ignites and is, as a rule, combusted as completely as possible with the hot exhaust air coming from the clinker cooler, called tertiary air. The heat of combustion generated is instantaneously transferred to the raw meal and is utilized for the further calcination of the raw meal even before introduction into the rotary kiln, the temperature not rising substantially above the dissociation temperature of the decarbonation reaction.

If the fuel supplied to the calcinator is a solid fuel, for example coal dust, and if this is not sufficiently finely ground and/or if this contains difficultly burning constituents such as, for example, anthracite, then the danger is not eliminated that the fuel does not completely burn up in the calcinator because the residence time in the calcinator of the unburned constituents, specifically the insufficiently burned-up solid fuel particles and/or, for example, CO formed by means of incomplete combustion, may become too short. In most cases, the residual burnup of these initially incompletely combusted constituents has been successfully effected by means of a special design of the combustion section of the calcinator, specifically by means of a diversion of the calcinator combustion section or of the ascending rotary kiln off-gas line at an angle of, for example, 90° to 180°, because further mixing of the residual fuels with atmospheric oxygen takes place in the pipe bend in order to promote the residual burnup at an acceptably low pressure drop. It has proved in practice, however, that there are cases in which the pipe bend alone is not sufficient to achieve the residual burnup of uncombusted reaction products of the calcinator fuel, especially when difficultly burning coal grades are employed and/or also when the metering of solid fuel to the calcinator fluctuates, which results in pulses of CO and uncombusted fuel particles passing through the combustion equipment.

Also in cement clinker production lines having calcinator and having substoichiometric fuel combustion in the ascending rotary kiln off-gas line for the purpose of creating a CO-containing reduction zone for the reduction of $NO_x$ contained in the off-gas German patent document (EP-PS 0 222 044), care must be taken that the CO catalytically active in the reduction zone, as well as any solid fuel particles initially uncombusted in the calcinator, have an opportunity to combust completely while still in the calcinator itself.

In an earlier unpublished German Patent Application P 40 26 814.4, it was proposed that a swirl chamber be arranged in a cement clinker production line, at the location in the calcinator where previously a pipe bend with diversion of the gas-solids suspension by, for example, 180° was present, that is, in the region of the highest point of the calcinator, the wall of which swirl chamber exhibits an opening in the lower region for the tangential inlet of the gas-solids suspension and an opening in the upper region for tangential discharge, the swirl chamber enabling very good mixing with atmospheric oxygen of the CO contained in the gas-solids suspension of the calcinator as well as any uncombusted fuel particles present, by which means the CO as well as the fuel particles can completely combust while still in the calcinator, so that the entire section or entire structural height of the calcinator can be definitely reduced by, for example, some 20% in comparison with the calcinators mentioned at the outset that were formerly usual.

OBJECTS AND SUMMARY OF THE INVENTION

It is an object of the invention further to improve a cement clinker production line, having swirl chamber arranged in the calcinator, with regard to pressure drop in the swirl chamber as well as the possibility of effecting controlled $NO_x$ reduction of the calcinator (and rotary kiln) off-gases in the swirl chamber.

The swirl chamber arranged roughly in the region of the highest point in the calcinator of the cement clinker production line in accordance with the invention exhibits an opening in its upper region for the tangential inlet of gas-solids suspension coming from the ascending branch of the calcination stage and a central opening on its bottom for the common discharge of the swirled gas-solids suspension into the descending branch of the calcination stage. In the case of the rotational flow forced in the cylindrical swirl chamber having vertical axis, as a consequence of the very good mixing of the gas-solids suspension and the $O_2$-containing gas, a maximally complete burnup or residual burnup of fuel constituents that have remained uncombusted in the ascending branch of the calcination stage, such as, for example, CO and residual carbon, is insured with the prolonged residence time of the gas-solids suspension in the reaction volume enlarged by the capacity of the swirl chamber. By this means, the air excess required for fuel combustion in the calcination stage can be lowered. Despite these advantages, the cyclone-like swirl chamber, having common discharge of the swirled gas-solids suspension by means of a central opening on the bottom of the swirl chamber, is characterized by a comparatively small pressure drop. As a consequence of the strong rotational flow in the swirl chamber, whose diameter may be 1.2 to 2 times the diameter of the gas-conveying pipelines of the calcination stage (ascending and descending branch), the danger of solids accumulations and pluggings is minimized, by which means a high operating reliability is insured.

Furthermore, by means of the swirl chamber of the calcinator in accordance with the invention, having the forced strong rotational flow, the possibility is opened up of creating a solids-poor (low-dust-content) core zone, of elevated temperature if appropriate, in the center of the swirl chamber; of holding the gas temperature constant in this core zone by means of controlled injection of fuel from the top of the swirl chamber; and of equipping this core zone of controlled temperature with a device for the injection of reactants such as $NH_3$ or aqueous ammonia solution for the purpose of additionally lowering the $NO_x$ contained in the off-gases. Thus, the $NO_x$ contained in the off-gas from the firing of the rotary kiln (here chiefly thermal $NO_x$) and from the firing of the calcinator (here chiefly fuel $NO_x$) can be effectively lowered in the low-dust-content core zone of the swirl chamber.

The zone of elevated temperature to be created in the core zone of the swirl chamber can also be utilized for carrying out other high-temperature reactions therein or also for combusting very difficultly burning fuels such as, for example, low-volatile coals therein. For this purpose, the gas temperature in the core zone of the swirl chamber can also be held at a still higher reaction temperature than, for example, ca. 1000° or 1100° C. At this high gas temperature, the cement raw meal particles would begin to stick together and adhere to the gas-conveying lines. This danger is, however, excluded with the swirl chamber of the calcination device in accordance with the invention, because as a consequence of the vigorous rotational flow in the swirl chamber the product material particles are thrown to the periphery of the swirl chamber, where they reach a temperature of up to at most 900° C. By means of this cement raw meal curtain, the walls of the swirl chamber are simultaneously protected against excessive thermal stress. The elevated temperature in the core region of the swirl chamber can, furthermore, be utilized for the still more complete conversion of CO still present in the off-gas to $CO_2$.

BRIEF DESCRIPTION OF THE DRAWINGS

The invention and its further features and advantages are explained in more detail on the basis of the exemplary embodiment illustrated schematically in the Drawing.

DETAILED DESCRIPTION OF THE DRAWINGS

The Drawing shows in schematic form an apparatus for the production of cement clinker from cement raw meal, which raw meal is inlet at (10) to the preheating stage (11), where it moves successively through the cyclone-type suspension heat exchangers (12 to 15) in combined cocurrent/countercurrent to the hot off-gas (16) of the calcination stage (17), to be separated from the gas stream in the cyclone separator (15) and, via the supply line (18), split at the raw meal parting (19) between the two material supply lines (20 and 21). The off-gas cooled against the cement raw meal leaves the preheating stage (11) of the apparatus at (16').

While the raw meal line (20) opens into the ascending off-gas line (22) of the rotary kiln (23), the raw meal line (21) opens into the tertiary air line (25) coming from the clinker cooler (24). Roughly in the region of the raw meal inlet, the ascending off-gas line (22) of the rotary kiln is provided with a fuel inlet (26) and the tertiary air line (25) with a fuel inlet (27). The cement raw meal calcined (deoxidized) in the calcination stage (17) is separated from the hot off-gas stream (16) in the cyclone (28) and inlet to the rotary kiln (23) as a high-assay (e.g., 95%) calcined cement raw meal (29), being burned to cement clinker in the sintering zone of said rotary kiln.

While the fuel (27), for example coal dust, is combusted with excess oxygen in the tertiary air (25), the fuel (26), likewise for example coal dust, is combusted under substoichiometric conditions in the ascending off-gas line (22) of the rotary kiln in order to form a CO-containing reduction zone adjacent to and above the fuel inlet (26), in which reduction zone the $NO_x$ component contained in the hot rotary kiln off-gas is reduced. The off-gases of the burner (26) and of the burner (27) are combined in the ascending pipe branch (30), adjacent to and above which there is a pipe bend (31).

A swirl chamber (33) having cylindrical cross section and vertical axis is arranged in the calcination stage (17) in the region of its flow diversion, that is, roughly in the pipe bend (31), that is, in the highest-lying region of the calcination stage. The swirl chamber (33) exhibits an opening (32) in its upper cylindrical region for the tangential inlet of the gas-solids suspension and a central opening on its bottom (34) for the discharge of the swirled gas-solids suspension into the descending pipe branch (35), which leads the gas-solids suspension to the lowermost cyclone (28). The diameter of the swirl chamber (33) is advantageously 1.2 to 2 times the diameter (d) of the gas-conveying pipes (30, 35) of the calcination stage (17).

In the swirl chamber (33), which produces only a comparatively very slight additional pressure drop, a rotation of the flow and intensive mixing of the gas-solids suspension arriving in the ascending pipe branch (30) with atmospheric oxygen from the clinker cooler is forced, which insures complete burnup or complete residual burnup of any fuels still present in the descending branch of the calcination stage (17) and thus insures a high degree of calcination of the cement raw meal.

The gas temperature in the pipe bend (31) of the calcination stage (17) is usually 850° to 890° C. In the center of the swirl chamber (33), a solids-free or solids-poor (low-dust-content) core zone (36) having an elevated temperature of, for example, 900° to 1100° C. is created. A fuel inlet (37) for the introduction of liquid or gaseous fuel in cocurrent with the calcinator off-gases may open into this core zone (36) of the swirl chamber (33) from its top. This additional fuel inlet (37) serves not just for the final calcination of the cement raw meal, but for the control of the temperature of the off-gas in the core zone (36) of the swirl chamber (33).

In accordance with a special feature of the invention, the core zone (36) of elevated temperature located in the swirl chamber (33) can be equipped with a device for the injection of reactants such as $NH_3$ or aqueous ammonia solution for the purpose of further lowering the $NO_x$ contained in the off-gases. For this purpose, the gas temperature in the core zone (36) of the swirl chamber (33) can also be held at a still higher reaction temperature than, for example, approximately 1000° or 1100° C. At this high gas temperature, the cement raw meal particles would begin to stick together and adhere to the gas-conveying lines. This danger is, however, eliminated in the swirl chamber (33) of the calcination device in accordance with the invention, because as a result of the intense rotational flow in the swirl chamber the particles of material (38) are thrown to the periphery of the swirl chamber (33), where they reach a temperature of up to at most 900° C. By means of this cement raw meal curtain (38), the walls of the swirl chamber (33) are simultaneously protected against excessive thermal stress. The elevated temperature in the core region (36) of the swirl chamber (33) can, furthermore, be utilized for the still more complete conversion of CO still present in the off-gas to $CO_2$.

The free cylindrical cross section of the swirl chamber (33) is strongly narrowed, via a conical section (39) arranged on its bottom, to the free cross section of the discharge opening (34) for the discharge of the swirled gas-solids suspension, by which means a good spreading of the cement raw meal curtain (38) downward into the central gas flow vortex is achieved.

In accordance with a further feature of the invention, ventilation nozzles (40) can be arranged on the conical section (39) of the swirl chamber (33) for controlled removal of solids, and also a solids recirculation line (41) can be arranged in the ascending branch (30) of the calcination stage (17), by which means there is enabled a lengthening of the residence time of both the cement raw meal to be calcined and also, in particular, the coarse-grained, difficulty burning fuel constituents and their complete combustion while still within the calcination stage (17).

What is claimed is:

1. Apparatus for thermal processing of raw materials, in dust form, in particular in the production of cement clinker from cement raw meal, said raw meal being thermally processed in a burning process by means of preheating, calcination, sintering and cooling, and the off-gas stream of the sintering stage and the exhaust air stream of the cooling stage from the clinker cooler being utilized separately or jointly for the calcination of the raw meal in the calcination stage (17), which is supplied with fuel, the gas-solids suspension in the calcination stage (17) being diverted and led into the lowermost cyclone (28) of the cyclone preheater for the purpose of separating the calcined raw meal (29) from the gas stream, a swirl chamber (33) being arranged in the calcination stage (17) in the region of its flow diversion with imparting of a swirl to the gas-solids suspension, characterized by the fact that the swirl chamber (33) exhibits an opening (32) in its upper region for the tangential inlet of all the gas-solids suspension and a central opening (34) on its bottom for the discharge of the swirled gas-solids suspension to said lowermost cyclone (28) via a gas-conveying pipe (35).

2. Apparatus in accordance with claim 1, characterized by the fact that the diameter of the swirl chamber (33) is 1.2 to 2 times the diameter (d) of the gas-conveying pipes (30, 35) of the calcination stage (17).

3. Apparatus in accordance with claim 2, characterized by the fact that the free cylindrical cross section of the swirl chamber (33) is narrowed, via a conical section (39) arranged on its bottom, to the free cross section of the discharge opening (34) for the discharge of the swirled gas-solids suspension to said lowermost cyclone (28).

4. Apparatus in accordance with claim 3, characterized by the fact that a fuel supply (37) opens into the center (36) of the swirl chamber (33) at its top.

5. Apparatus in accordance with claim 4, characterized by the fact that a temperature measuring means is arranged in the solids-free or solids-poor center (36) of the swirl chamber (33), which temperature measuring means is in effective connection to a fuel supply (37) into the swirl chamber (33) for the purpose of maintaining a core zone (36) of elevated temperature in the center (36) of the swirl chamber.

6. Apparatus in accordance with claim 5, characterized by the fact that the core zone (36) of elevated temperature located in the swirl chamber (33) is equipped with a device for the injection of reactants such as $NH_3$ or aqueous ammonia solution for the purpose of further lowering the $NO_x$ contained in the off-gases.

7. Apparatus in accordance with claim 6, characterized by the fact that, for the purpose of creating a CO-containing reduction zone for $NO_x$ reduction in the off-gas, a burner (26) with substoichiometric fuel combustion opens into the ascending branch of the calcination stage (17) into the rotary kiln off-gas line (22) before the tertiary air (25) coming from the clinker cooler (24) is admixed.

8. Apparatus in accordance with claim 3, characterized by the fact that ventilation nozzles (40) are arranged on the conical section (39) of the swirl chamber (33), and also a solids recirculation line (41) interconnects the conical section (39) and the ascending branch (30) of the calcination stage (17).

9. An apparatus for the production of cement clinker by thermal processing of cement raw meal in dust form through stages of preheating, calcinating, sintering and cooling, said apparatus including a cyclone preheater with a plurality of vertically offset cyclones (12-28), a sintering kiln (23) and a clinker cooler (24), and further comprising:

an ascending pipe branch (30) in said calcinating stage for carrying gas-solids suspension, an off-gas line (22) connecting the lower end of said ascending pipe branch (30) to said kiln (23) to convey the off-gas stream from the kiln (23), a tertiary air line (25) interconnecting said clinker cooler (24) with said ascending pipe branch (30) at an intermediate point in its height and carrying the exhaust air stream from said clinker cooler (24), means supplying fuel to said off-gas line (22), a swirl chamber (33) in said calcinating stage having a tangential inlet opening (32) at its upper end connected to the upper end of said ascending pipe branch (30) for receiving all the gas-solids suspension and having a central opening (34) at its bottom, the diameter of said swirl chamber being substantially greater than the diameter of said ascending pipe branch, a descending pipe branch (35) in said calcination stage connected at its upper end to said central opening (34) of said swirl chamber (33) and connected at its lower end to the lowermost cyclone (28) of said cyclone preheater, said lowermost cyclone (28) separating calcinated raw meal from the gas stream and delivering the separated raw meal to said kiln (23), and a supply line (18) interconnecting the next to lowest cyclone (15) to said off-gas line (22), said swirl chamber (33) being operative during operation to throw raw meal to the periphery of the swirl chamber (33) to create a raw meal curtain protecting the walls of said swirl chamber against excessive thermal stress and a fuel inlet (37) at the top center of said swirl chamber (33) for elevating the temperature of the central core region (36) of said swirl chamber for more complete conversion of CO in the off-gas to $CO^2$.

10. The apparatus of claim 9 wherein said swirl chamber includes a conical section (39) at its bottom terminating in said central opening (34) and wherein said raw material curtain extends downwardly to said central opening (34).

11. The apparatus of claim 10 and further comprising removal means operable to effect the controlled removal of solids from said conical section (39) including a solids recirculation line (41) interconnecting said removal means and said ascending pipe branch (30).

12. The apparatus of claim 9 and further comprising a device for injecting reactants into the core zone (36) of said swirl chamber to lower the $NO_x$ contained in the off-gases.

* * * * *